United States Patent
Klein

[15] 3,702,387
[45] Nov. 7, 1972

[54] ELECTRICAL CONNECTIONS
[72] Inventor: Leo I. Klein, Clairton, Pa.
[73] Assignee: Emerson Electric Co., St. Louis, Mo.
[22] Filed: June 4, 1971
[21] Appl. No.: 150,010

[52] U.S. Cl. .................219/91, 29/611, 29/628, 174/94 R, 219/107, 338/329
[51] Int. Cl. ...............................B23k 9/28
[58] Field of Search ..219/91, 117, 107; 29/611, 619, 29/621, 628, 482; 174/77, 94 R, 1; 338/299, 329

[56] References Cited

UNITED STATES PATENTS

| | | | |
|---|---|---|---|
| 3,492,624 | 1/1970 | Oakley | 219/93 X |
| 2,899,666 | 8/1959 | Drugmand et al. | 338/329 |
| 3,119,172 | 1/1964 | Mazenko et al. | 29/628 |

Primary Examiner—R. F. Staubly
Assistant Examiner—L. A. Schutzman
Attorney—Michael Williams

[57] ABSTRACT

In an electric resistance heating element, the invention relates to the assembly of a resistor coil to a terminal pin to provide mechanical and electrical connection therebetween. The assembly is particularly suited for use in strip heaters wherein the coil is connected to the flat head of a terminal bolt.

A group of convolutions of the resistor coil are flattened against the bolt head and welded thereto by a resistance welding operation. In the method disclosed, the shank of the bolt is disposed within an opening in one welding electrode of a welding machine with the bolt head overlying the tip of such electrode, and the group of convolutions of the coil are placed against the flat surface of the bolt head. The other welding electrode has a rounded tip and as this electrode is moved toward said one electrode, its rounded tip flattens the group of convolutions in overlapping relation on the flat surface of the bolt head. With the flattened convolutions and the bolt head firmly gripped between the welding electrodes, welding current is caused to flow between the electrodes to weld the flattened convolutions to the flat surface of the bolt head. Those flattened convolutions at the center of the rounded tip of said other electrode are fully fused to the flat surface of the bolt head, whereas the convolutions off the center of such rounded tip have a stick weld to the flat surface. Thus, not only is a low resistance electrical connection made by the fully fused convolutions, but a good mechanical connection is made by the stick-welded convolutions.

2 Claims, 3 Drawing Figures

PATENTED NOV 7 1972　　　　　　　　　　　　　　　3,702,387
Fig.1.
Fig.2.
Fig.3.
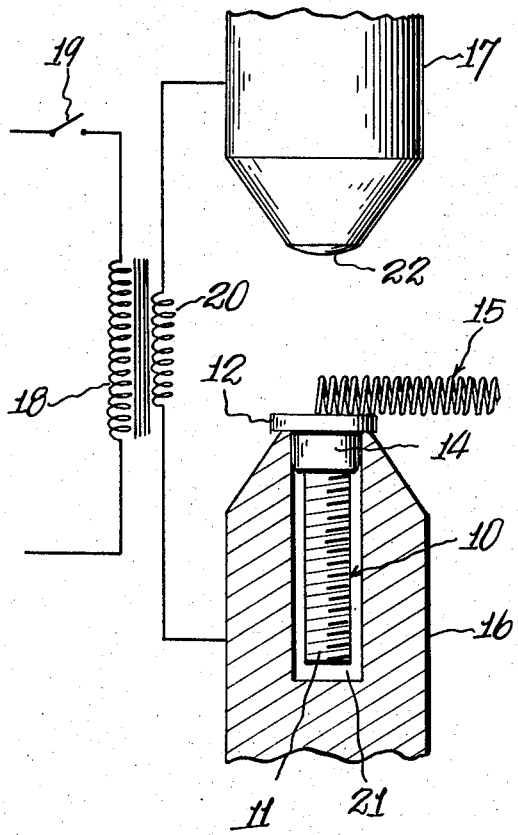
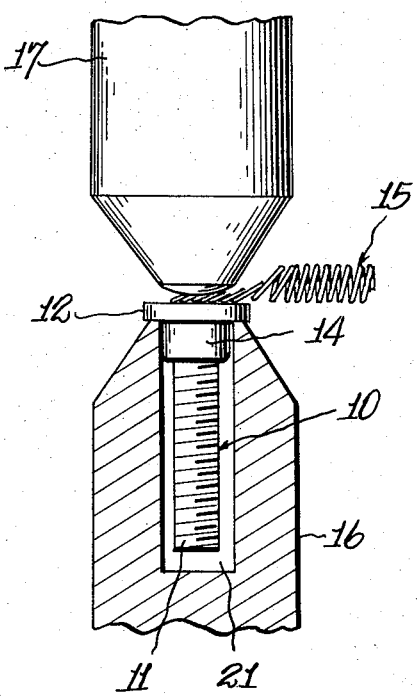
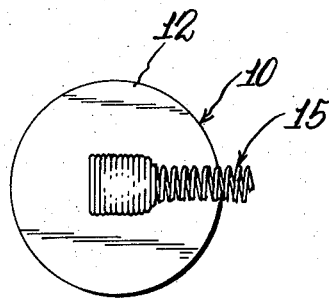
INVENTOR.
LEO J. KLEIN
BY
Michael Williams
ATTORNEY

3,702,387

ELECTRICAL CONNECTIONS

BACKGROUND AND SUMMARY

Insofar as I am aware, a resistor coil has usually been connected to a terminal bolt of a strip heater by winding an uncoiled tail around the shank of the bolt and pressing a washer on the shank to clamp the tail end between the washer and the head of the bolt. A typical connection of this type is shown in U.S. Pat. No. 2,256,706, issued to T. M. Fox, of Sept. 23, 1941.

A connection of the type described above has been found satisfactory enough to warrant its continued use, primarily because no better substitute had been developed. Such connection had disadvantages in that it required a washer, which was an additional part, and required the apparatus and labor for pressing the washer onto the bolt shank. Further, since the coil end was wound about the bolt shank, the overlapped ends of the wound portion were pressed against each other upon assembly of the washer and sometimes severed the wire portion leading to the coil.

A further disadvantage existed in that the prior connection required a hand wound resistor coil in order to provide a tail ends for winding about the terminal bolt shank, whereas the present invention permits the use of machine-wound coils which may be square cut to predetermined lengths.

The present invention provides a connection of high quality and low cost, and has none of the disadvantages above mentioned. Accordingly, it is the principal object of the invention to provide new and improved connections between a resistor coil and a terminal pin or bolt of an electric heating element, and new and improved methods for making such connections.

DESCRIPTION OF THE DRAWING

In the drawing accompanying this description and forming a part of this specification, there is shown, for purpose of illustration, an embodiment which my invention may assume, and in this drawing:

FIG. 1 is a fragmentary side elevational view of a pair of separated welding electrodes, with a terminal bolt and resistor coil positioned therebetween, FIG. 2 is a view similar to FIG. 1 but showing the electrodes closed, and FIG. 3 is an enlarged view of the top of a terminal bolt head, showing the connection resulting from the welding operation.

DESCRIPTION OF PREFERRED EMBODIMENT

Typical constructions of strip heaters are illustrated in the above-noted Fox patent and therefore a detailed description of such type of heater is believed unnecessary, since the heater is general forms no part of this invention. Briefly, and as shown in the Fox patent, a resistor is formed as a helically wound resistance wire and is embedded in high compacted refractory material which is contained within a metal sheath. Opposite ends of the resistor coil are connected to respective terminal bolts, and the latter are adapted to be connected to a source of electrical energy. The present invention is directed to improved connections, and improved methods of making such connections, between the resistor coil and the terminal bolt.

In the drawing, the terminal bolt is generally designated by the reference numeral 10 and comprises a threaded shank 11 and a flat head 12. An enlargement 14 may be formed between the shank and the head, although it is not necessary for purposes of this invention.

The resistor coil is generally designated by the reference numeral 15 and is preferably machine wound and cut to size by a square cut. An end of the coil 15 is shown as overlying the upper flat surface of the bolt head 12 and this coil may be held in position by hand, or by any suitable holding device.

The lower electrode of a resistance welding machine, such as a spot welder, is shown at 16, the upper electrode of such machine is shown at 17. The diameter of the wire from which the coil is wound is relatively small (it may be in the order of about 0.020 inches) and because of the delicate nature of this wire, a capacitor discharge welder is preferably employed. For purposes of this disclosure, the welding circuit is shown only in general manner, and includes a welding transformer having its primary winding 18 connectable to a source of electrical energy, the flow of current through the primary being controlled by a switch 19. The opposite ends of the secondary 20 of the transformer are connected, respectively, to the electrodes 16 and 17.

The lower electrode 16 has an opening 21 extending inwardly from its upper end to receive the bolt shank 11, and the enlargement 14 if it is formed on the terminal bolt 10. The lower face of the bolt head rests on the upper surface of the lower electrode 16.

The resistor coil 15 is held in position to overlie the bolt head, as seen in FIG. 1, and the end of the coil need not extend materially beyond the center of the head 12. The upper electrode 17 has a rounded tip 22 and, as it is brought down on the coil, the tip flattens a group of convolutions of the coil, as seen in FIG. 2, adjoining flattened convolutions overlapping each other. With flattened convolutions pressed between the electrode tip 22 and the upper flat surface of the bolt head 12, the switch 19 is closed to cause flow of current through the primary 18 and thus induce flow of welding current through the secondary circuit to weld the flattened convolutions to the bolt head.

In view of the fact that the electrode tip 22 is rounded, those convolutions at the center of the tip are fully fused to the bolt head to provide a low-resistance electrical connection, whereas the convolutions off center of the tip 22 have a stick weld to the bolt head to provide a mechanical connection which relieves the fully fused center weld of stresses which may be caused by relative movement of the coil and terminal bolt during assembly operations.

I claim:

1. The method of electrically and mechanically connecting a resistor coil of an electric strip heater to a flat surface on the head of a terminal bolt which is adapted to be connected to a source of electrical energy, comprising;
    disposing the shank of the bolt in an opening in one electrode of a resistance welding machine with the bolt head overlying the tip of the electrode and its flat surface exposed,
    positioning a group of convolutions of said resistor coil against said flat surface, moving another electrode of said welding machine toward said one electrode so that its tip flattens said group of convolutions between it and said flat surface, said tip being round whereby said convolutions are overlapped as they are flattened, and passing welding current from one electrode through the group of flattened convolutions and said bolt head and to the other electrode while pressing said rounded tip against said flattened convolutions whereby the overlapped convolutions at the center of said rounded tip are fully fused to said flat surface and the overlapped convolutions off the center of said rounded tip have a stick weld to said flat surface.

2. The method of electrically and mechanically connecting a helically coiled resistance wire of an electric heating element to a surface of a terminal pin which is adapted to be connected to a source of electrical energy, comprising:

supporting said terminal pin on a first electrode of a resistance welding machine, supporting a group of convolutions of said resistance wire crosswise of said pin surface with an outer peripheral portion thereof against said pin surface, moving a second electrode of said welding machine toward said first electrode to press against an opposite outer peripheral portion of said group of convolutions and deform the latter from helically coiled form to a flattened condition between said second electrode and said pin surface, and passing welding current from one electrode through the flattened group of convolutions and pin surface to the other electrode to weld said group of flattened convolutions to said terminal pin surface.

* * * * *